(12) United States Patent
Takahashi et al.

(10) Patent No.: US 12,240,157 B2
(45) Date of Patent: Mar. 4, 2025

(54) INTEGRALLY MOLDED BODY AND METHOD OF MANUFACTURING SAME

(71) Applicant: Toray Industries, Inc., Tokyo (JP)

(72) Inventors: Yuki Takahashi, Nagoya (JP); Hideaki Sasaki, Nagoya (JP); Tatsuya Abe, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 354 days.

(21) Appl. No.: 17/910,770

(22) PCT Filed: Mar. 9, 2021

(86) PCT No.: PCT/JP2021/009274
§ 371 (c)(1),
(2) Date: Jan. 18, 2023

(87) PCT Pub. No.: WO2021/187236
PCT Pub. Date: Sep. 23, 2021

(65) Prior Publication Data
US 2023/0294340 A1    Sep. 21, 2023

(30) Foreign Application Priority Data

Mar. 18, 2020   (JP) .................................. 2020-047162

(51) Int. Cl.
*B29C 45/76*    (2006.01)
*B29C 45/14*    (2006.01)
(Continued)

(52) U.S. Cl.
CPC .... *B29C 45/1657* (2013.01); *B29C 45/14065* (2013.01); *B29C 45/76* (2013.01);
(Continued)

(58) Field of Classification Search
CPC ........... B29C 2945/76658; B29C 2945/76859; B29C 45/14065; B29C 45/1657;
(Continued)

(56) References Cited

U.S. PATENT DOCUMENTS

| 11,110,685 B2 | 9/2021 | Sasaki et al. |
| 2017/0001351 A1 | 1/2017 | Nakamura et al. |

FOREIGN PATENT DOCUMENTS

| JP | 6-210669 A | 8/1994 |
| JP | 6-285911 A | 10/1994 |

(Continued)

OTHER PUBLICATIONS

International Search Report dated May 11, 2021, of corresponding International Application No. PCT/JP2021/009274 along with an English translation.

*Primary Examiner* — Lawrence D Ferguson
(74) *Attorney, Agent, or Firm* — DLA Piper LLP (US)

(57) ABSTRACT

An integrally molded body has a rectangular planar structure in which an inner resin material containing a thermoplastic resin is interposed between a plate material having a design surface and an outer resin material containing a thermoplastic resin, the planar structure having a first joint in which at least a partial region of the outer-peripheral-side surface part and/or the outer peripheral edge part of the plate is joined with the inner resin material, and a second joint in which at least a partial region of the outer-peripheral-side surface part and/or the outer peripheral edge part of the inner resin material is joined with the outer resin material.

7 Claims, 13 Drawing Sheets

(51) Int. Cl.
*B29C 45/16* (2006.01)
*B29C 70/12* (2006.01)

(52) U.S. Cl.
CPC .... *B29C 70/12* (2013.01); *B29C 2945/76658* (2013.01); *B29C 2945/76859* (2013.01)

(58) Field of Classification Search
CPC ......... B29C 45/76; B29C 70/12; B29C 45/14; B29C 45/16; B29C 45/26
See application file for complete search history.

(56) References Cited

FOREIGN PATENT DOCUMENTS

| | | |
|---|---:|---|
| JP | 8-318547 A | 12/1996 |
| JP | 2000-167863 A | 6/2000 |
| JP | 2003-156126 A | 5/2003 |
| JP | 2005-1215 A | 1/2005 |
| JP | 2007-313835 A | 12/2007 |
| JP | 2017-13417 A | 1/2017 |
| WO | 2018/110293 A1 | 6/2018 |

INTEGRALLY MOLDED BODY AND METHOD OF MANUFACTURING SAME

TECHNICAL FIELD

This disclosure relates to a manufacturing method of an integrally molded body suitably used as component parts or housings of personal computer, office automation equipment, cellular phone or the like requiring light weight, high strength and high rigidity with thin material.

BACKGROUND

Recently, electric/electronic equipment has been required to have a small size and light weight since personal computer, office automation equipment, audiovisual equipment, cellular phone, telephone equipment, home electric appliance and toy become portable. For the purpose of achieving such a requirement, thin materials have been used for device component parts such as housing not to greatly bend, contact and break internal component parts when external load is applied to the device. Further, reliability of joint strength has been required for small-sized and lightweight structures molded by integrally joining a fiber-reinforced resin structure with another material such as frame material.

WO 2018/110293 discloses an integrally molded body in which a bonding resin (C) is interposed between a board (A) and a material (B), one surface of the board being a design side, comprising a first junction, by which at least a partial region of an outer peripheral edge section of the board (A) bonds to the bonding resin (C) to space apart the board (A) and the material (B), wherein at least at a part of the design side of the integrally molded body, a region where the board (A), the material (B), and the bonding resin (C) are exposed is provided, which can allow for a plurality of structures to be joined with high joint strength and allows for the joint boundary thereof to have favorable smoothness, thereby making it possible to mitigate warping and reduce weight and thickness even when the molded body has a board constituent material.

JP 2005-1215 A discloses a manufacturing method of injection-molded product to manufacture component parts with a multipoint injection molding machine, comprising: a skin film-placing step to place a skin film on either movable or fixed die of the multipoint injection molding machine; a first charging step to solidify a molten resin with leaving a cavity by injecting the molten resin into the cavity in the one die from a first injection gate of another die other than the movable or fixed die; and a second charging step to solidify the molten resin injected into the cavity from the second injection gate provided in the other die provided with the first injection gate after the first charging step, which can make so-called the weld line of an injection molded product invisible even when manufacturing molded products with a multipoint injection molding machine.

JP H08-318547 A discloses an injection molding method to inject a molten resin to a die provided with a cavity having two sprues, wherein an injection molding machine equipped with two injection units at positions corresponding to the locations of two sprues injects the molten resin from the two injection units into the die simultaneously or with time interval, the two injection units performing a repetitive process of injection and suck back alternately after injecting the molten resin until it is solidified by being cooled so that the molten resin is forced to swing in the cavity. Accordingly, the orientation of molten resin is disturbed to make the strength of molded product uniform in all positions. Specifically, JP H08-318547 A discloses that the resin containing reinforcing material such as glass fiber and carbon fiber can be prevented from deteriorating strength at a joint portion of molten resin by tangling the reinforcing material not to be oriented unidirectionally at the joint portion.

JP H06-210669 A discloses an injection molding apparatus having a mold comprising: a plurality of gates provided by an opening in the cavity; a plurality of runners provided in communication with the plurality of gates; and a plurality of flow control mechanisms to control the plurality of runners to increase or decrease control flow rates per hour at different times. Since the amount of resin flowing from each gate per unit time increases or decreases at different timings, the positions where the flows of the plurality of resins flowing into the cavity from the plurality of gates meet in the cavity depend on the increase or decrease in the amount of resin inflow for each gate so that the resin is distributed to the left and right of the line corresponding to the weld line. As a result, the weld line that should occur at the confluence becomes a finely intricate line on the left and right, and substantially disappears.

JP H06-285911 A discloses a resin molding mold comprising: a pressure detecting means for detecting that the pressure of the molten resin exceeds a predetermined value at a position closer to the first position than the third position when the molten resin injected into the resin-filled space simultaneously from the first and the second gates is joined; a small space to retract the molten resin injected from the first gate toward a position closer to the first position than the third position; and a valve means for closing an inlet of the small space on the resin-filled space side normally, and opening the inlet to guide a part of the molten resin into the small space to retract the molten resin when the pressure exceeds the predetermined value in response to the pressure detecting means. Because of relatively high flow pressure on the opposite side in the portion to form a weld line by the resin nearby guided and retracted into the small space when the gate is controlled to open or close while the valve opens, the central part of the tip of the flow makes the uneven weld line deep. Therefore, such a portion is strengthened.

JP 2000-167863 A discloses a weld reinforcement method for a short fiber-reinforced thermoplastic resin, wherein a continuous fiber-reinforced thermoplastic resin composite material having a predetermined heat characteristic is insert-molded to reinforce the weld. It can greatly improve the strength of weld without using any special apparatus.

There are situations where resin flow has to be divided in the resin-filled space (cavity) in the die. Such divided flows may not be fully merged but be solidified to form a weld line (which may be "weld portion") at a joint portion. The weld line formed at the joint portion might locally deteriorate its strength.

In WO 2018/110293 disclosing the method of integrally molding the plate material and the frame material joined by injection molding, no mention of weld line supposed to appear in the injection molding process is made and therefore the problem should be resolved by reinforcement.

In JP 2005-1215 A, because the charged amount in the second charging step is decreased by the amount charged in the first charging step from the whole amount, so-called mold clamping force can greatly be reduced from the force required to clamp for the whole amount and, therefore, the weld line to appear at molten resin contact part can be covered up by the skin film to improve surface appearance. However, the skin film covering the weld line cannot sufficiently prevent the strength from deteriorating at the joint part of the weld line.

In the injection molding method of JP H08-318547 A, the molten resin is forced to swing in cavity 35 by operating screws 12 and 22 of injection units 10 and 20 alternately forward and backward to disturb the orientation of molten resin so that sufficient strength is given to molded products. However, the manufacturing apparatus should have control mechanism for performing a repetitive process of injection and suck back by operating screws 12 and 22 of injection units 10 and 20 alternately forward and backward. When the molded product has a complex shape, the control mechanism and the manufacturing process might be complicated with increased number of injection units and injection gates.

In JP H06-210669 A, there might be increased manufacturing cost for controlling resin flow rates per hour from the gate in injection molding, as well as void generation and ununiform inflow of resin into cavity caused by continuously changing the inflow amount of resin.

In JP H06-285911 A, because the pressure of molten resin inflow is adjusted to form the uneven weld line deep, the molten resin is partially guided into the resin tank provided outside the forming die. With that configuration, it is necessary to ensure extra space of the die that is difficult to prepare and tends to increase the size. In addition, the deep weld line has to be formed efficiently by detecting the molten resin pressure for feedback to operate the valve opening/closing. Such a feedback control might make the control sequence complicated so that a whole manufacturing process becomes complicated.

In JP 2000-167863 A, because the weld line is reinforced by insert-molding with a reinforcing material, the laminated reinforcing material makes molded products thick against demand of thin products.

Accordingly, it could be helpful to provide an integrally molded body and a manufacturing method thereof, capable of manufacturing light and thin products having reduced warpage and high joint strength of integrally joined structure prevented from deteriorating the strength even when the weld line appears at the joint portion of resin material when a plurality of structures are joined by injecting resin material from a plurality of injection gates.

SUMMARY

We thus provide:

[1] An integrally molded body having a rectangular planar structure comprising:
a plate material (A) having a surface of design side; an outer resin material (C1) containing a thermoplastic resin and; an inner resin material (B1) containing a thermoplastic resin interposed between the plate material (A) and the outer resin material (C1), the rectangular planar structure having:
a first junction to join the inner resin material (B1) with a whole region or a partial region of an outer peripheral side face and/or an outer peripheral edge of the plate material (A); and a second junction to join the outer resin material (C1) with a whole region or a partial region of an outer peripheral side face and/or an outer peripheral edge of the inner resin material (B1), wherein one or more weld lines are formed on the inner resin material (B1) and the outer resin material (C1) on a side (non-design side) opposite the design side of the plate material (A), and a first weld line (B2) formed on the inner resin material (B1) is located at a position shifted from that of a second weld line (C2) formed on the outer resin material (C1) closest to the first weld line (B2) in a direction parallel to an outer peripheral side of the integrally molded body.

[2] The integrally molded body according to [1], wherein a ratio of M2/M1 is 0.04 to 0.4, where the M1 (mm) is a length of the outer peripheral side of the integrally molded body while the M2 (mm) is a distance between the first weld line (B2) and the second weld line (C2) closest to the first weld line (B2).

[3] The integrally molded body according to [1] or [2], wherein the first weld line (B2) is formed in a narrow width portion (B1') of the inner resin material (B1).

[4] The integrally molded body according to any one of [1] to [3], wherein the second weld line (C2) is formed in a narrow width portion (C1') of the outer resin material (C1).

[5] The integrally molded body according to any one of [1] to [4], wherein the first junction is formed around all of the outer peripheral side face and/or the outer peripheral edge of the plate material (A).

[6] The integrally molded body according to any one of [1] to [5], wherein the second junction is formed around all of the outer peripheral side face and/or the outer peripheral edge of the plate material (A).

[7] The integrally molded body according to any one of [1] to [6], wherein the inner resin material (B1) or the outer resin material (C1) contains a discontinuous reinforcing fiber having a weight average fiber length of 0.3 to 3 mm.

[8] A method of manufacturing an integrally molded body comprising:
a first step of injecting a precursor of an outer resin material (C1) from a plurality of second resin injection gates (GC) into a molding die to preliminarily form the outer resin material (C1); a second step of placing a plate material (A) at a position spaced from at least a part of the outer resin material (C1) in the outer resin material (C1); and a third step of injecting a precursor of an inner resin material (B1) from a plurality of first resin injection gates (GB) into a gap between the plate material (A) and the outer resin material (C1) to form the integrally molded body having a rectangular planar structure comprising:
a first junction to join the inner resin material (B1) with at least a partial region of an outer peripheral side face and/or an outer peripheral edge of the plate material (A); and a second junction to join the outer resin material (C1) with at least a partial region of an outer peripheral side face and/or an outer peripheral edge of the inner resin material (B1), wherein an injection condition of the inner resin material (B1) and the outer resin material (C1) is controlled so that a first weld line (B2) formed on the inner resin material (B1) is located at a position shifted from that of a second weld line (C2) formed on the outer resin material (C1) closest to the first weld line (B2) in a direction parallel to an outer peripheral side of the integrally molded body when viewed from a side (non-design side) opposite a design side of the plate material (A).

[9] The method according to [8], wherein the injection condition is such that one of the first resin injection gates (GB) for injecting the precursor of inner resin material (B1) is provided at a position shifted from the second resin injection gate (GC) for injecting the precursor of the outer resin material (C1) closest to the first resin injection gate (GB) with respect to the direction parallel to the outer peripheral side of the integrally molded body.

Our integrally molded body and a manufacturing method thereof can manufacture light and thin products having a high strength and a reduced warpage, even with a plate material component member, of integrally molded body made by joining a plurality of structures with injected resin by a high joint strength.

EXPLANATION OF SYMBOLS

Figure 1:
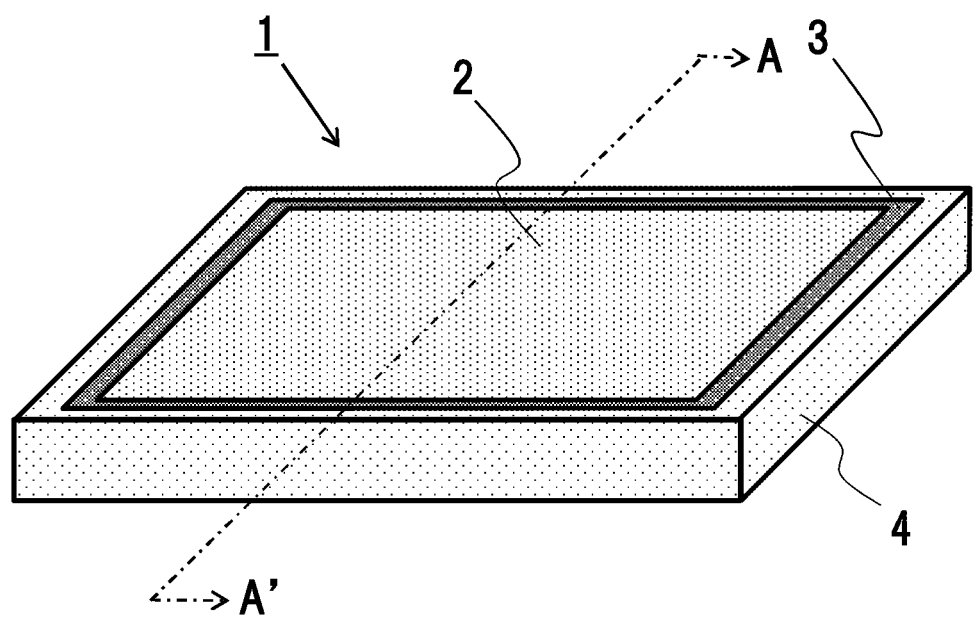
FIG. 1 is a perspective view of our integrally molded body.

1: integrally molded body
2: plate material (A)
3: inner resin material (B1)
4: outer resin material (C1)
5: first junction
6: second junction
7: region of exposed plate material (A), inner resin material (B1) and outer resin material (C1)
10: cavity surface of molding die
11: molten resin material
12: traveling direction of resin material in molding die
13: resin material near surface
14: molten resin material inside
15: region of colliding resin materials
16: weld line (B2)
17: weld line (C2)
18: length of outer periphery M1 of integrally molded body
19: distance M2 between weld line (B2) and weld line (C2) closest thereto
21: resin injection gate (GC)
22: resin injection gate (GB)
23: distance L2 between resin injection gate (GB) and resin injection gate (GC) closest thereto
24: narrow width portion of inner resin material (B1)
25: narrow width portion of outer resin material (C1)
30: lower molding die
31: upper molding die
32: upper molding die

DETAILED DESCRIPTION

Hereinafter, our molded bodies and methods will be explained with reference to the figures. This disclosure is not limited to the figures and Examples in particular.

Our integrally molded body 1 having a rectangular planar structure comprises: plate material (A) having a surface of design side; outer resin material (C1) containing thermoplastic resin and; inner resin material (B1) containing thermoplastic resin interposed between plate material (A) and outer resin material (C1), the rectangular planar structure comprising: a first junction to join the inner resin material (B1) with a whole region or a partial region of an outer peripheral side face and/or an outer peripheral edge of the plate material (A); and a second junction to join the outer resin material (C1) with a whole region or a partial region of an outer peripheral side face and/or an outer peripheral edge of the inner resin material (B1), wherein one or more weld lines are formed on the inner resin material (B1) and the outer resin material (C1) on a side (non-design side) opposite the design side of the plate material (A), and weld line (B2) formed on the inner resin material (B1) is located at a position shifted from that of weld line (C2) formed on the outer resin material (C1) closest to the weld line (B2) in a direction parallel to an outer peripheral side of the integrally molded body.

Figure 2:
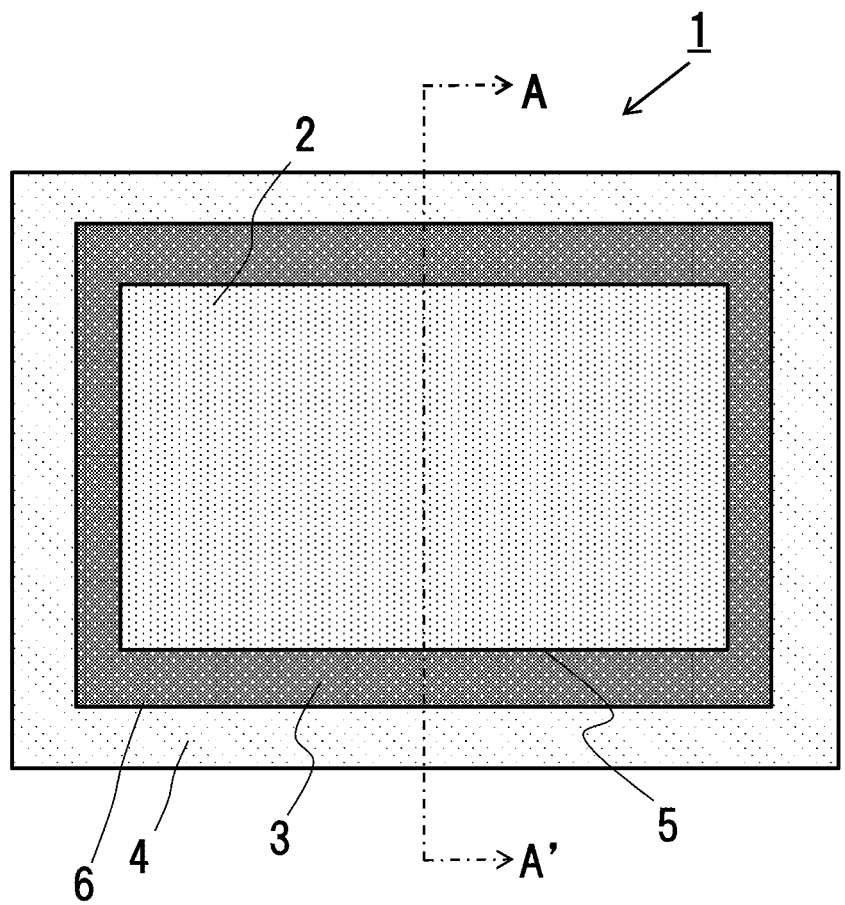
FIG. 2 is a plan view of our integrally molded body.
Figure 3:
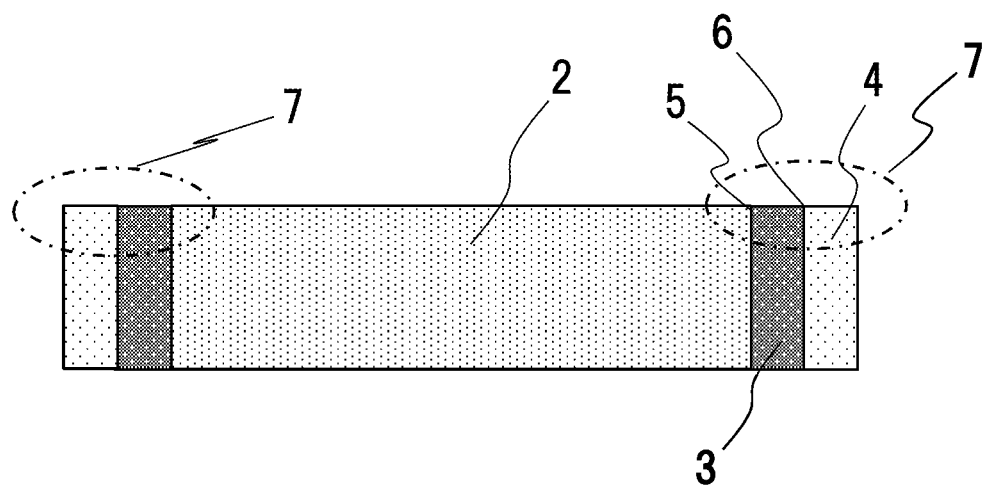
FIG. 3 is a cross section view of A-A' line of FIG. 1 or FIG. 2.

FIGS. 1, 2 and 3, respectively, show a perspective view, a plan view and A-A' cross section view of integrally molded body 1. Integrally molded body 1 has inner resin material (B1) 3 interposed between plate material (A) 2 and outer resin material (C1) 4. Plate material (A) 2 and inner resin material (B1) 3 are joined at first junction 5 while inner resin material (B1) 3 and outer resin material (C1) 4 are joined at second junction 6. Plate material (A) 2 has a design side which is shown in FIG. 2 as well as the top of FIG. 3.

Further, plate material (A) 2, inner resin material (B1) 3 and outer resin material (C1) 4 are exposed in region 7 of the same plane as a surface of the design side of integrally molded body 1.

The outer peripheral edge of plate material (A) 2 implies a plane region near the outer periphery of plane molded structure of plate material (A) 2, the region extending from an outer peripheral end side to a width of 0 to 15% of length of the side. The outer peripheral side face implies an end having a surface orthogonal to the plane of outer periphery of plane molded structure of plate material (A) 2. Inner resin material (B1) 3 has a configuration similar to the one described above.

Next, we will explain about the weld line where two flows of molten resin meet and which is formed on non-design side (opposite the design side) of plate material (A) 2 of each of inner resin material (B1) 3 and outer resin material (C1) 4.

Figure 4:
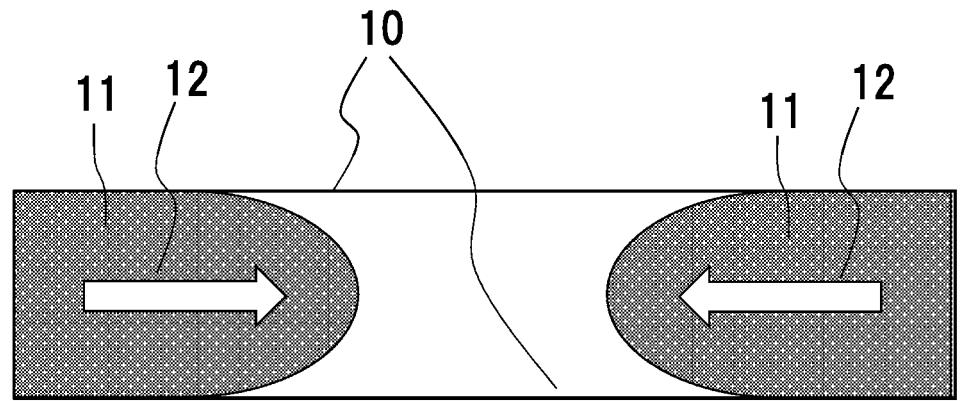
FIG. 4 is a schematic cross section view of enlarged region of inner resin material (B1) or outer resin material (C1) of FIG. 3, showing resin flow in molding die by injection molding.

As shown in FIG. 4, when molten resin material 11 (precursor of inner resin material (B1) 3, precursor of outer resin material (C1) 4) is injected into the injection molding die from a plurality of resin injection gates, molten resin material 11 travels along cavity surface 10 of molding die in the directions of arrows 12 in the molding die. The resin injection gates are provided on right and left ends although they are not illustrated in FIG. 4.

Figure 5:
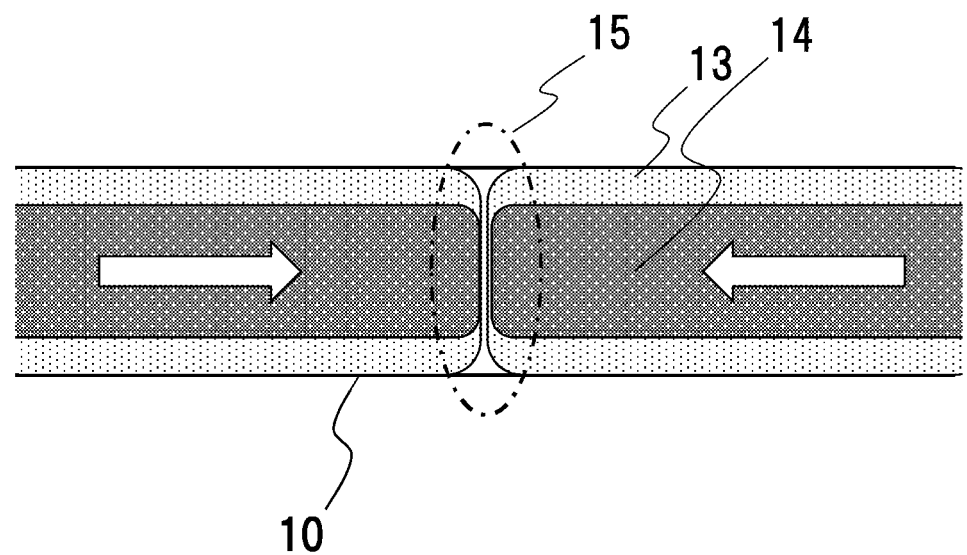
FIG. 5 is a schematic cross section view of enlarged region of inner resin material (B1) or outer resin material (C1) of FIG. 3, showing a weld line where two flow fronts of molten resin materials coming from right and left meet.

Then, as shown in FIG. 5, molten resin material 11 flowing in the molding die travels as keeping the molten state while tip of molten resin material 11 is solidified by temperature difference in the cavity as time goes by since injection. Further, another region close to the molding die is solidified from the molten state as well by the temperature difference to cavity surface 10 of the molding die. In such a partial solidification, both molten resin materials 11 traveling in the directions of arrows 12 collide in region 15.

In region 15 of collision, partially solidified molten resin material 11 forms a line where two flow fronts of molten resin meet. The line, which is also called "weld line", tends to deteriorate local strength of molded body relatively.

When molten resin material 11 is a fiber-reinforced resin to be described later, reinforcing fibers tend to be provided without crossing the weld line so that uniform dispersion of reinforcing fibers is disturbed to make the weld strength uneven near the weld line.

In integrally molded body 1, one or more weld lines are formed on each inner resin material (B1) 3 and each outer resin material (C1) 4, and weld line (B2) formed on inner resin material (B1) 3 in parallel with an outer peripheral side of integrally molded body 1 is located at a position different from that of weld line (C2) formed on outer resin material (C1) 4 closest to weld line (B2).

Figure 6:
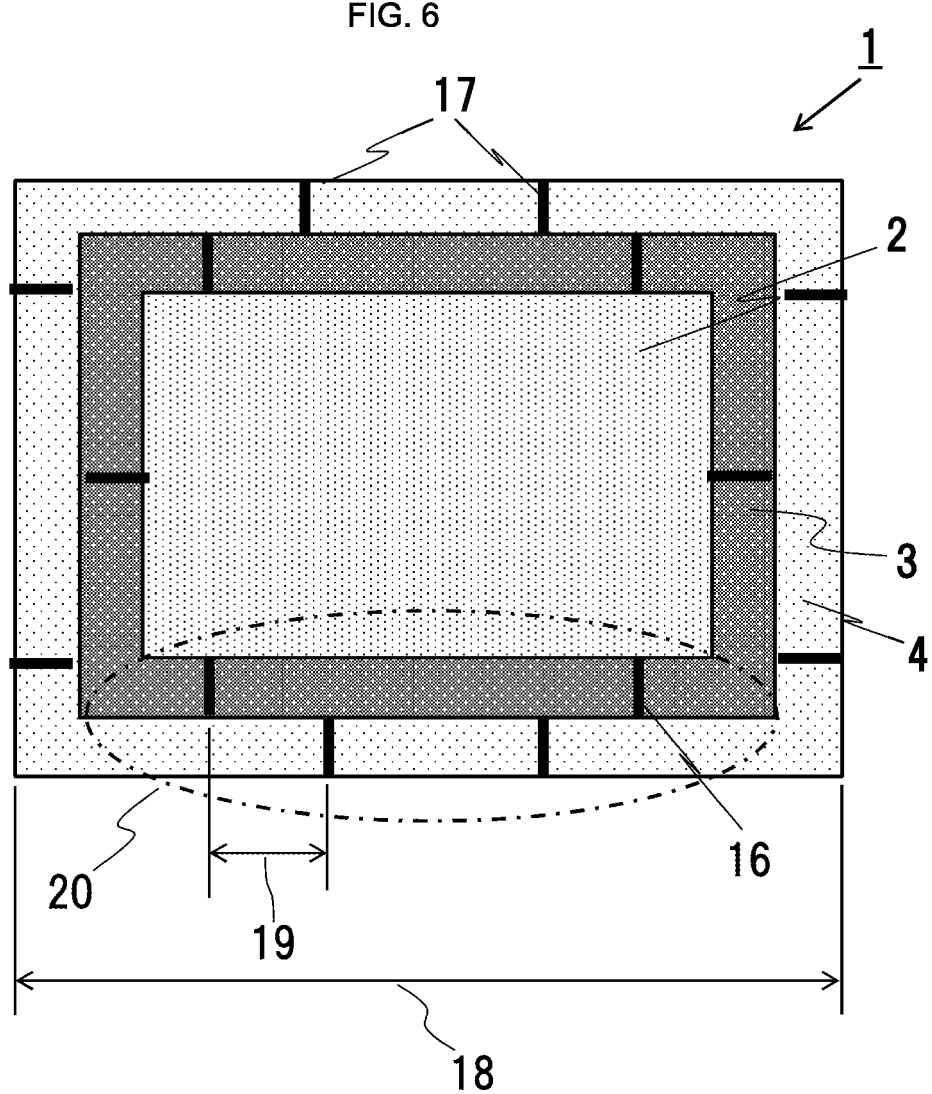
FIG. 6 is a bottom view of non-design side of our integrally molded body showing position relation of a weld line formed by two flow fronts of molten resin materials injected from a plurality of resin injection gates.

In an example of configuration shown in FIG. 6, there are weld lines (B2) 16 of which two are formed each in top and bottom sides and of which one is formed each in right and left sides of inner resin material (B1) 3. In FIG. 6, there are weld lines (C2) 17 of which two are formed each in top and bottom sides and of which two are formed each in the center of right and left sides of outer resin material (C1) 4. In FIG. 6, any weld line (B2) 16 and any weld line (C2) 17 are located at different positions in the direction along the outer peripheral side of integrally molded body 1. Namely, any weld line (B2) 16 and any weld line (C2) 17 do not form a continuous weld line. Such a configuration can prevent a whole molded body from deteriorating strength by complementing insufficient strength at the weld line with another resin material having no weld line formed.

It is preferable that a ratio of M2/M1 is 0.04 to 0.4, where M1 (mm) is a length of outer peripheral side of integrally molded body 1 while M2 (mm) is a distance between weld line (B2) 16 and weld line (C2) 17 closest to weld line (B2).

As shown in FIG. 6, the length of outer peripheral side of integrally molded body 1 has a predetermined relation with the distance between weld line (B2) 16 and its closest weld line (C2) 17 so that the strength (which may be called "weld strength", hereinafter) at the weld line can be improved from a strength that would have been poorer in overlapped weld line positions.

When M2/M1 is less than 0.04, the distance between weld line (B2) 16 and closest weld line (C2) 17 might be too narrow to maintain sufficient weld strength. When M2/M1 is more than 0.4, the distance between weld line (B2) 16 and weld line (C2) might not contribute to improving the weld strength even though a predetermined distance is secured. It is preferable that the M2/M1 is 0.07 to 0.4, preferably 0.10 to 0.4.

It is preferable that weld line (B2) 16 is formed in narrow width portion (B1') 18 of inner resin material (B1) 3. As well, it is preferable that weld line (C2) 17 is formed in narrow width portion (C1') 19 of outer resin material (C1) 4. With such weld line formed in narrow width portion (C1') 19, the width of weld line that might be a factor of deteriorated strength of molded body can be shortened to suppress strength deterioration.

Figure 7:
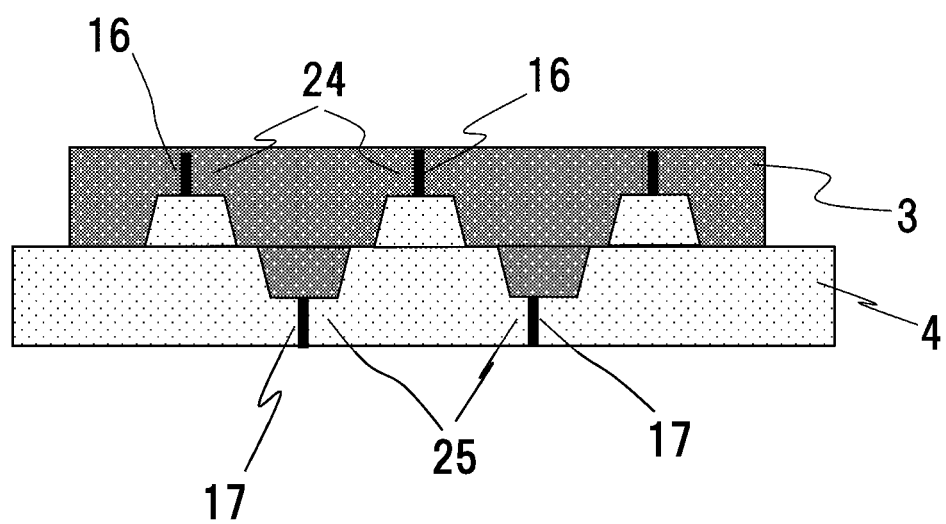
FIG. 7 is a cross section view of our integrally molded body having inner resin material (B1) and outer resin material (C1) provided with narrow width portion of which width becomes narrow.

FIG. 7 shows an example of inner resin material (B1) 3 and outer resin material (C1) 4 which have narrow width portions formed into continuous concavo-convex shapes. Weld line (B2) 16 is formed in narrow width portion (B1') 24 of inner resin material (B1) 3 while weld line (C2) 17 is formed in narrow width portion (C1') 25 of outer resin material (C1) 4. Such narrow width portions can be provided by adjusting the location or the like of resin injection gate.

It is preferable that first junction 5 is formed around all of outer peripheral side face of plate material (A) 2. Such first junction 5 to join inner resin material (B1) 3 formed around all the outer peripheral side face of plate material (A) 2 can achieve a high joint strength with thin material of integrally molded body 1 as a whole.

It is preferable that second junction 6 is formed around all of outer peripheral side face of inner resin material (B1) 3. Such second junction 6 to join outer resin material (C1) 4 formed around all the outer peripheral side face of inner resin material (B1) 3 can achieve a high joint strength with thin material of integrally molded body 1 as a whole.

It is preferable that either inner resin material (B1) 3 or outer resin material (C1) 4 contains a discontinuous reinforcing fiber having a weight average fiber length of 0.3 to 3 mm.

The discontinuous fiber and continuous fiber are defined as follows. The continuous fiber is a reinforcing fiber which is contained in integrally molded body 1 by a substantively continuous distribution over the total length or the total width of integrally molded body 1. The discontinuous fiber consists of reinforcing fibers which are cut and distributed intermittently.

When the weight average fiber length of discontinuous reinforcing fibers remained in inner resin material (B1) 3 or outer resin material (C1) 4 is 0.3 mm or more, the shrinkage rate of inner resin material (B1) 3 or outer resin material (C1) 4 can be decreased to reduce warpage of integrally molded body 1. When the weight average fiber length is less than 0.3 mm, the warpage might not be reduced sufficiently because of weak effect of low shrinkage rate. When the weight average fiber length is more than 3 mm, the resin viscosity might become too high to uniformly charge inner resin material (B1) 3 or outer resin material (C1) 4 up into four corners of molding die. It is preferable that the discontinuous fiber has a weight average fiber length of 0.4 to 2.8 mm. It is more preferable that the weight average fiber length of the discontinuous carbon fiber is 0.7 to 1.5 mm, preferably 0.9 to 1.2 mm.

The weight average fiber length is not a simple average but is calculated by the formula below which has been modified by applying calculation of weight average molecular weight for considering the contribution of fiber length. The formula is applied as assuming reinforcing fibers have a constant fiber diameter and density.

$$\text{Weight average fiber length} = \Sigma(Mi^2 \times Ni)/\Sigma(Mi \times Ni)$$

Mi: fiber length (mm)
Ni: number of reinforcing fibers having fiber length Mi

The above-described measurement of weight average fiber length can be performed by the following method. A molded product is heat treated at 500° C. for 60 minutes to take out reinforcing fibers of the molded product to be uniformly dispersed in water. The dispersion water containing uniformly dispersed reinforcing fibers is dried in a petri dish for observation by optical microscope (×50-200). Lengths of randomly-selected 500 reinforcing fibers are measured to calculate the weight average fiber length by the above-described formula.

It is preferable that inner resin material (B1) 3 or outer resin material (C1) 4 contains discontinuous reinforcing fibers having a weight average fiber content of 1 to 50 wt %. Such a configuration can enhance joint strength and reduce warpage of molded body 1. When the weight average fiber content is less than 1 wt %, the strength of molded body 1 might not be secured. When it is more than 50 wt %, inner resin material (B1) 3 or outer resin material (C1) 4 might not be charged sufficiently in injection molding. It is preferably 5 to 40 wt %. It is more preferably 8 to 35 wt %, preferably 12 to 30 wt %.

It is preferable that inner resin material (B1) 3 contains a discontinuous fiber made of carbon fiber from viewpoints of rigidity and lightness.

It is preferable that outer resin material (C1) 4 contains a discontinuous fiber made of glass fiber. Outer resin material (C1) 4 containing glass fiber can function as electric wave transmissible material.

It is preferable that inner resin material (B1) 3 or outer resin material (C1) 4 is made of a thermoplastic resin to form a joint structure in which inner resin material (B1) 3 and outer resin material (C1) 4 are fusion-bonded by the thermoplastic resin. Such a configuration can achieve a higher joint strength of integrally molded body 1. The fusion-bonded joint structure is formed by cooling the materials which have been molten with heat.

It is preferable that plate material (A) 2 contains a metal material or a carbon fiber-reinforced resin material.

From a viewpoint of enhancing strength and rigidity of integrally molded body 1, it is preferable that plate material (A) 2 has a high strength and a high rigidity and is excellent in lightness. From viewpoints of high strength and high rigidity, it is preferable that plate material (A) 2 is made of a metal or a fiber-reinforced resin. For the purpose of improving the lightness, it is preferable to provide a sandwich structure of a core layer of which both sides are sandwiched by skin layers made of the metal material or the fiber-reinforced resin material, wherein the core layer is made of one or more kinds of core materials which are made of discontinuous fiber-reinforced resin expanded in a width direction, the discontinuous fiber-reinforced resin contains a discontinuous fiber with a resin sheet, a foam or a resin. Such a carbon fiber-reinforced resin material using carbon fibers reinforcing the fiber-reinforced resin material can achieve the high rigidity, lightness and the reduced thickness.

On the other hand, the metal material may be titanium, steel, stainless steel, aluminum, magnesium, iron, silver, gold, platinum, copper or nickel, or an alloy primarily consisting of these elements. It is possible that the material is subject to a plating treatment.

It is preferable that the fiber-reinforced resin material, the carbon fiber-reinforced resin material or the core material is made from a thermoplastic resin or a thermosetting resin.

Plate material (A) 2, inner resin material (B1) 3 and outer resin material (C1) 4 may be made of any one of the following thermoplastic resins, although they are not limited in particular. It may be a polyester resin such as polyethylene terephthalate (PET) resin, polybutylene terephthalate (PBT) resin, polytrimethylene terephthalate (PTT) resin, polyethylene naphthalate (PEN) resin and liquid crystalline polyester resin, a polyolefin resin such as polyethylene (PE) resin, polypropylene (PP) resin and polybutylene resin, polyoxymethylene (POM) resin, polyamide (PA) resin, a polyarylene sulfide resin such as polyphenylene sulfide (PPS) resin, polyketone (PK) resin, polyether ketone (PEK) resin, polyetheretherketone (PEEK) resin, polyether ketone ketone (PEKK) resin, polyether nitrile (PEN) resin, a fluorine-based resin such as polytetrafluoroethylene resin, a crystalline resin such as liquid crystal polymer (LCP), a styrene-based resin, an amorphous resin such as polycarbonate (PC) resin, polymethylmethacrylate (PMMA) resin, polyvinyl chloride (PVC) resin, polyphenylene ether (PPE) resin, polyimide (PI) resin, polyamide-imide (PAI) resin, polyetherimide (PEI) resin, polysulfone (PSU) resin, polyethersulfone resin and polyarylate (PAR) resin, phenol-based resin, phenoxy resin, or a thermoplastic resin selected from thermoplastic elastomers of polystyrene-based resin, polyolefin-based resin, polyurethane-based resin, polyester-based resin, polyamide-based resin, polybutadiene-based resin, polyisoprene-based resin, fluorine-based resin and acrylonitrile-based resin, or a copolymer or a modified resin thereof. Above all, it may be polyolefin resin preferable from a viewpoint of lightness of molded products, polyamide resin preferable from a viewpoint of strength, an amorphous resin such as polycarbonate resin, styrene-based resin and modified polyphenylene ether-based resin, preferable from a viewpoint of surface appearance, polyarylene sulfide resin preferable from a viewpoint of heat resistance, and polyetheretherketone resin preferable from a viewpoint of continuous operating temperature.

It is preferable that plate material (A) 2 is made of a thermosetting resin such as unsaturated polyester resin, vinylester resin, epoxy resin, phenol (resol type) resin, urea melamine resin, polyimide resin, maleimide resin and benzoxazine resin. It is possible that it is made of a resin made by blending two or more kinds thereof. Above all, the epoxy resin is preferable from viewpoints of dynamics properties and heat resistance of molded bodies. To exhibit the excellent mechanical characteristics of epoxy resin, it is preferable that the thermosetting resin contains the epoxy resin primarily, for example, by 60 wt % relative to the resin composition.

From a viewpoint of saving weight, it is preferable that plate material (A) 2 or inner resin material (B1) 3 is made of a carbon fiber based on polyacrylonitrile (PAN), pitch, rayon or the like being excellent in specific strength and specific rigidity. It is more preferable that the carbon fiber is based on polyacrylonitrile (PAN).

Next, our manufacturing method of integrally molded body will be explained with reference to the figures.

Our manufacturing method of integrally molded body comprises:

[1] injecting a precursor of outer resin material (C1) 4 from a plurality of resin injection gates (GC) 21 into a molding die to preliminarily form outer resin material (C1) 4,

[2] placing plate material (A) at a position spaced from at least a part of outer resin material (C1) in outer resin material (C1) 4,

[3] injecting a precursor of inner resin material (B1) 3 from a plurality of resin injection gates (GB) 22 into a gap between plate material (A) 2 and outer resin material (C1) 4 to form integrally molded body 1 having a rectangular planar structure comprising: a first junction to join the inner resin material (B1) with at least a partial region of an outer peripheral side face and/or an outer peripheral edge of the plate material (A); and a second junction to join the outer resin material (C1) 4 with at least a partial region of an outer peripheral side face and/or an outer peripheral edge of the inner resin material (B1), wherein an injection condition of the inner resin material (B1) 3 and the outer resin material (C1) 4 is controlled so that weld line (B2) 16 formed on the inner resin material (B1) 3 is located at a position shifted from that of weld line (C2) 17 formed on the outer resin material (C1) 4 closest to the weld line (B2) 16 in a direction parallel to an outer peripheral side of the integrally molded body 1 when viewed from a side (non-design side) opposite a design side of plate material (A) 2.

Figure 8:
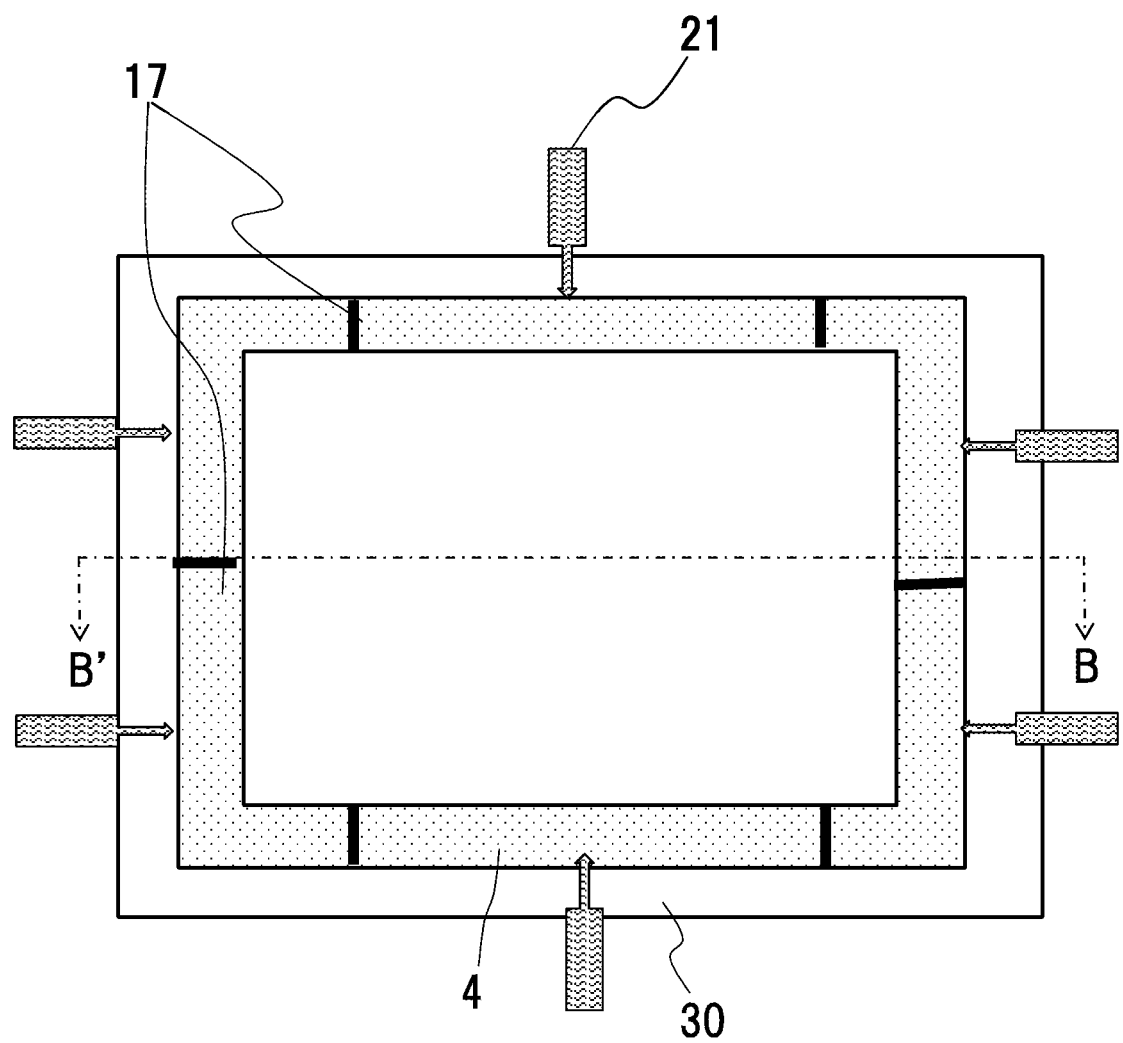
FIG. 8 is a bottom view showing step [1] to preliminarily form outer resin material (C1) by injecting precursor of outer resin material (C1) into molding die from a plurality of resin injection gates (GC).
Figure 9:
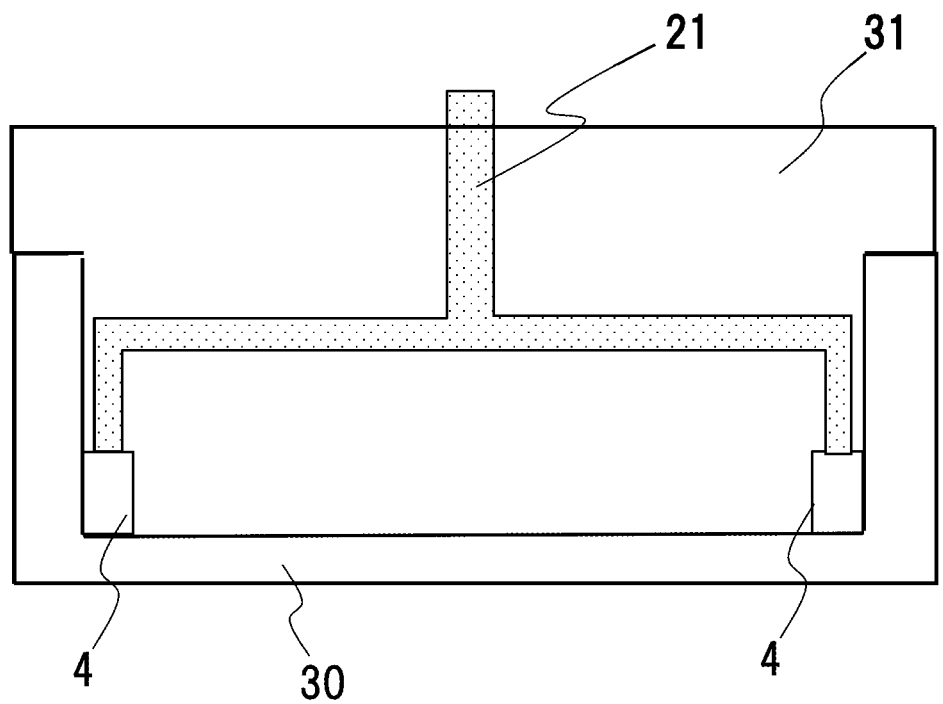
FIG. 9 is a cross section view of molding die provided with space (cavity) to form outer resin material (C1) and resin injection gate (GC) for injecting outer resin material (C1) in step [1] to preliminarily form outer resin material (C1).

As shown in FIGS. 8 and 9, step [1] comprises injecting a precursor of outer resin material (C1) 4 from a plurality of resin injection gates (GC) 21 into a molding die, to form outer resin material (C1) 4 in lower molding die 30 and upper molding die 31 provided a space (cavity) to form outer resin material (C1) 4.

In the example shown in FIG. 8, there are resin injection gates (GC) 21 of which one is formed each in top and bottom sides and of which two are formed each in right and left sides of outer resin material (C1) 4. There are weld lines (C2) 17 of which two are formed each in top and bottom sides and of which one is formed each in right and left sides of outer resin material (C1) 4. Weld lines (C2) 17 are formed near the middle of adjacent resin injection gates (GC) 21.

Figure 10:
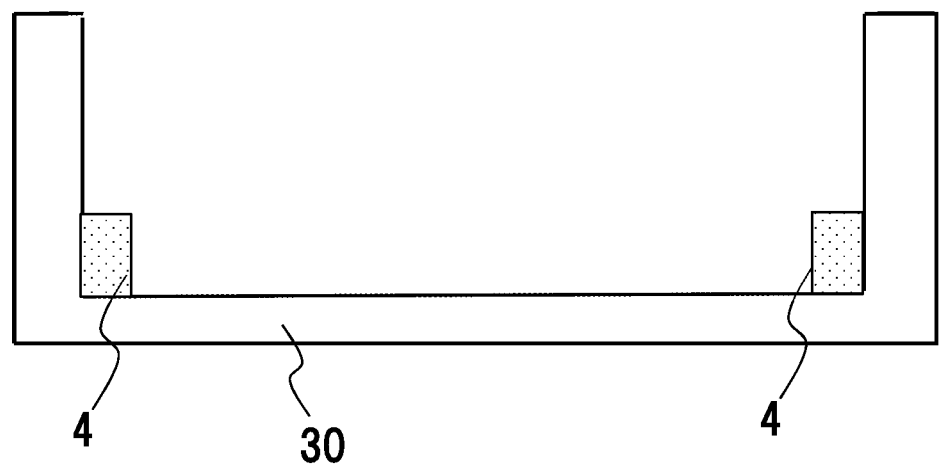
FIG. 10 is a cross section view of B-B' line of FIG. 7, showing a state after removing upper die from outer resin material (C1) formed by injecting precursor of outer resin material (C1).

Outer resin material (C1) 4 is cooled and then upper molding die 31 is removed as shown in FIG. 10. The resin is injected laterally from resin injection gates (GC) in FIG. 8 while it is injected downward in FIG. 9. Such injection directions can be designed arbitrarily according to a shape of molding die or the like, even in the following explanation.

Figure 11:
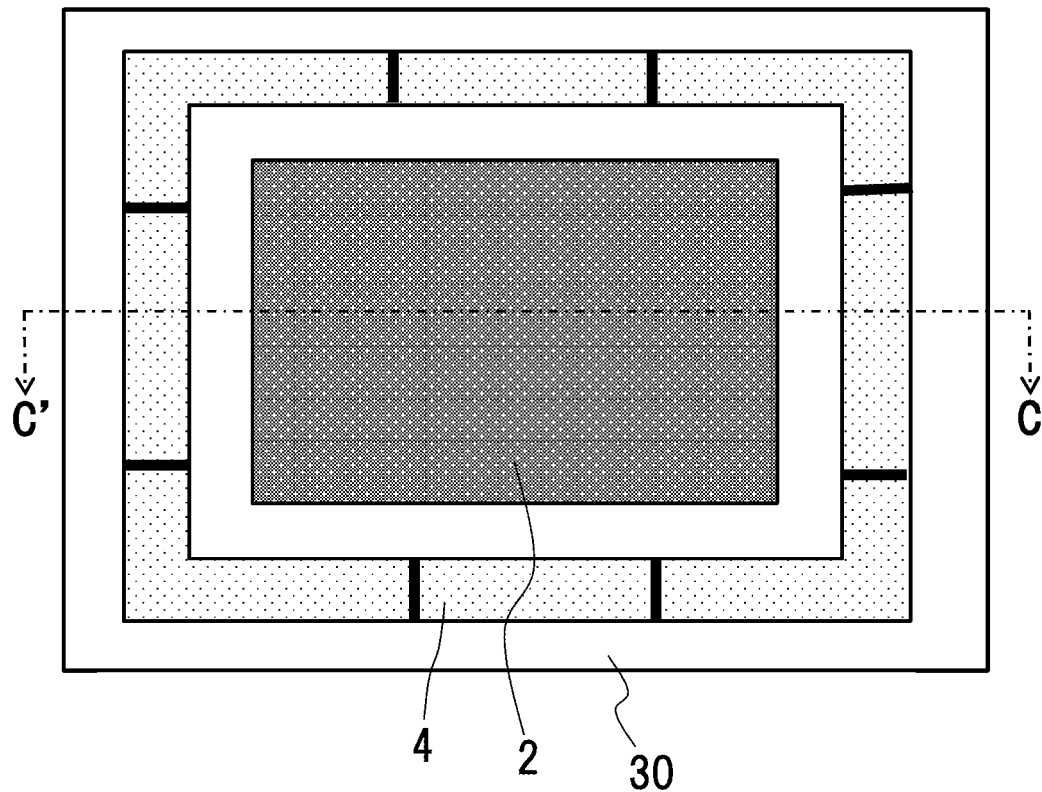
FIG. 11 is a bottom view showing step [2] to place plate material (A) having a design side in molding die so that at least a part of the plate material is spaced from outer resin material (C1) in outer resin material (C1).
Figure 12:
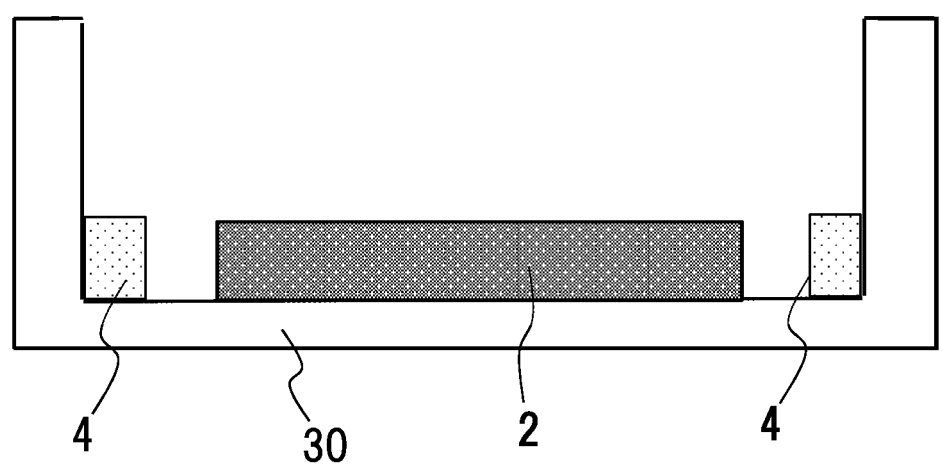
FIG. 12 is a cross section view of C-C' line of FIG. 11.

As shown in FIGS. 11 and 12, step [2] comprises placing plate material (A) at a position spaced from at least a part of outer resin material (C1) 4 in outer resin material (C1) 4. The plate material (A) 2 has been provided with a design side on one side.

Figure 13:
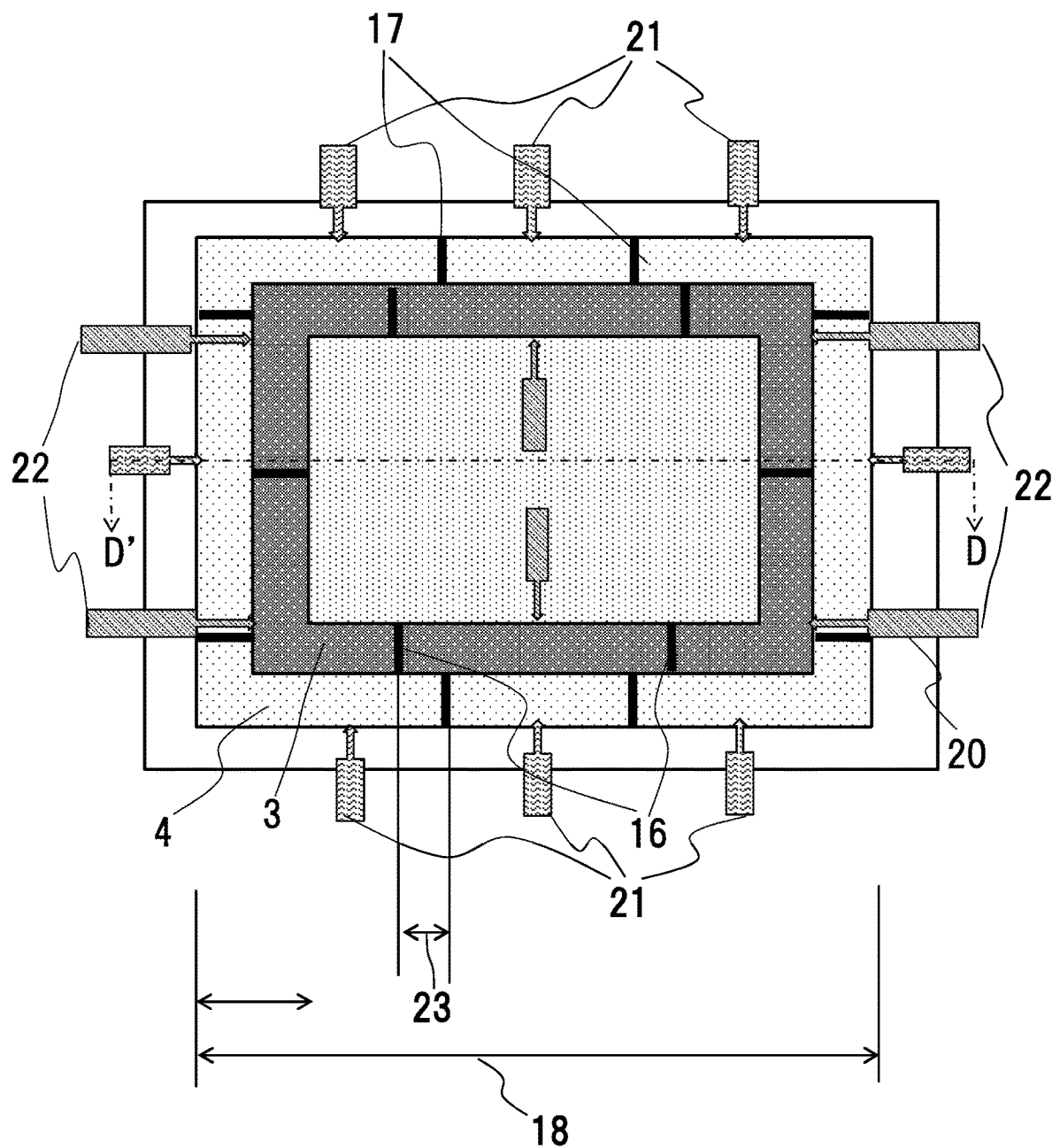
FIG. 13 is a bottom view showing step [3] according to an example to place preliminarily formed outer resin material (C1) and then form inner resin material (B1) by injecting precursor of inner resin material (B1) from a plurality of resin injection gates (GB).
Figure 14:
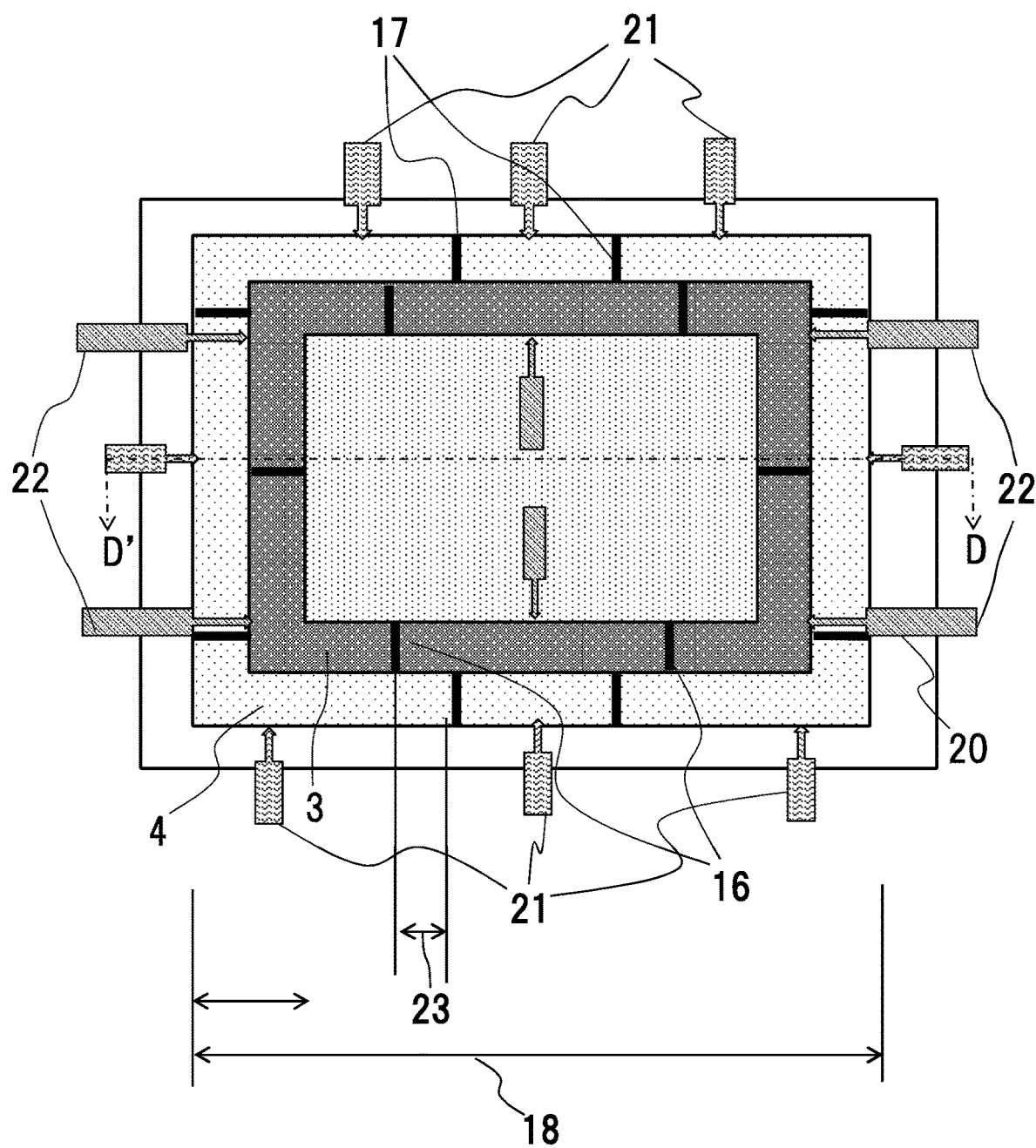
FIG. 14 is a bottom view showing step [3] according to another example of FIG. 13 to place preliminarily formed outer resin material (C1) and then form inner resin material (B1) by injecting precursor of inner resin material (B1) from a plurality of resin injection gates (GB).

As shown in FIGS. 13 and 14, step [3] comprises: injecting a precursor of inner resin material (B1) 3 from a plurality of resin injection gates (GB) 22 into a gap between plate material (A) 2 and outer resin material (C1) in a space (cavity) formed by lower molding die 30 and upper molding die 32 to form inner resin material (B1) 3 joined with plate material (A) or inner resin material (B1) 3.

There are resin injection gates (GB) 22 for forming inner resin material (B1) 3, the gates of which one being formed each in top and bottom sides and of which two being formed each in right and left sides of inner resin material (B1) 3. Then, there are weld lines (B2) 16 of which two are formed each in top and bottom sides and of which one is formed each in right and left sides of inner resin material (B1) 3.

Figure 18:
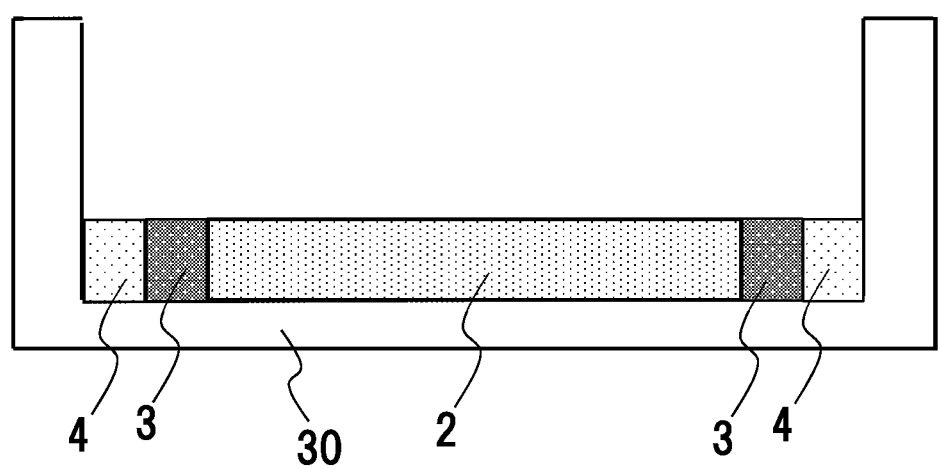
FIG. 18 is a cross section view of D-D' line of FIG. 12, showing a state after removing upper molding die from inner resin material (B1) formed by injecting precursor of inner resin material (B1).

As shown in FIG. 18, integrally molded body 1 can be prepared by removing upper molding die 32 after cooling inner resin material (B1) 3.

Not to make weld line (B2) 16 continuous with weld line (C2) 17, it is important to adjust each injection condition of precursors of inner resin material (B1) 3 and outer resin material (C1) 4. Such an adjustment of the injection condition to make weld line (B2) 16 and weld line (C2) 17 discontinuous can suppress deteriorated strength of molded bodies.

To make weld line (B2) 16 discontinuous from weld line (C2) 17, it is preferable that a resin injection gate (GB) 22 for injecting the precursor of inner resin material (B1) 3 is provided at a position shifted from the resin injection gate (GC) 21 for injecting the precursor of outer resin material (C1) 4 closest to the resin injection gate (GB) 22 with respect to a direction parallel to the outer peripheral side of integrally molded body 1, as shown in FIG. 13. With such a positional configuration, weld lines in inner resin materials (B1) 3 are not formed continuously with weld lines in outer resin materials (C1) 4 so that insufficient strength at the weld lines can be complemented by different resin materials to prevent a whole molded body from deteriorating strength.

To adjust the injection condition, the position shift of resin injection gate might be restricted by device layout.

In such a situation, it is preferable that the weld lines are made discontinuous by setting different injection pressures of adjacent resin injection gates (GB) 22 to inject precursor of inner resin materials (B1) 3 so that the weld lines are provided at positions shifted from the center between adjacent resin injection gates.

It is also preferable to make a difference between injection pressures of adjacent resin injection gates (GB) 22 as well as a difference between injection pressures of adjacent resin injection gates (GC) 21 to inject outer resin material (C1) 4. It is preferable that both injection pressures are adjusted not to make the weld lines continuous.

Figure 19:
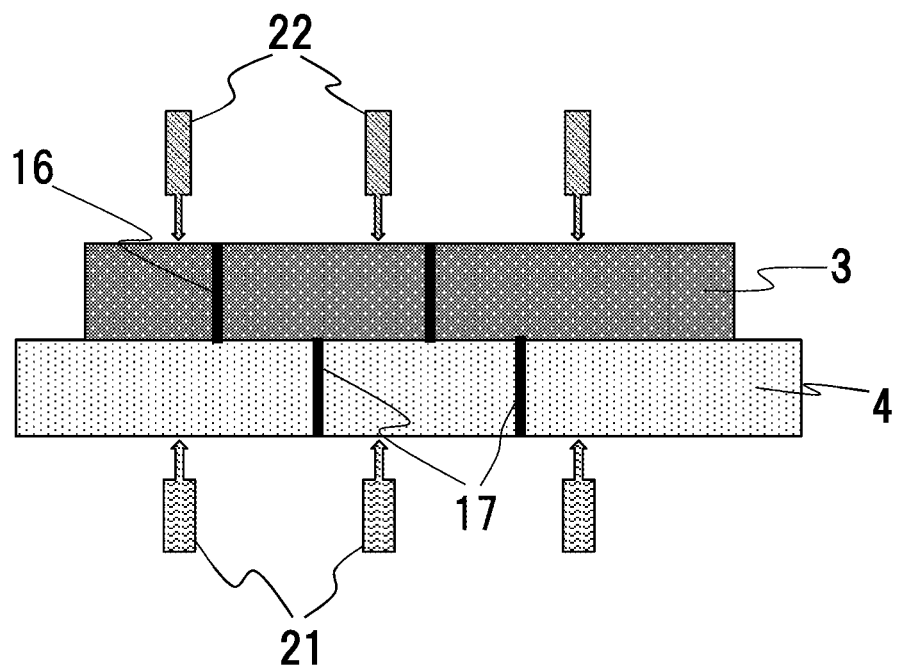
FIG. 19 is a cross section view of materials shown in FIG. 13.

FIG. 19 is a cross section view including inner resin material (B1) 3, outer resin material (C1) 4 and weld lines formed on them shown in FIG. 13. Resin injection gates (GB) 22 and resin injection gates (GC) 21 are formed along a line continuously for downsizing a molding device. When inner resin material (B1) is injected from adjacent resin injection gates 22*a* and 22*b*, injection pressure of resin injection gate 22*b* is set higher to form weld line 16 closer to resin injection gate 22*a*.

Further, when outer resin material (C1) 4 is injected from adjacent resin injection gates 21*a* and 21*b*, injection pressure of resin injection gate 21a is set higher to form weld line 17 closer to resin injection gate 21b. As a result, weld line 16 can be formed as spaced from weld line 17.

Alternatively, it is preferable that injected resin temperature is set different between adjacent resin injection gates.

Alternatively, it is preferable that a flow path of the precursor of inner resin material (B1) 3 connecting adjacent resin injection gates has a part of which cross section is different in a plane orthogonal to a flow direction of inner resin material (B1) 3.

EXAMPLES

Hereinafter, our integrally molded body 1 and manufacturing method thereof will be explained concretely with reference to Examples, although this disclosure is not limited in particular.

The measurement methods for Examples are as follows.
(1) Measurement of Weld Strength of Integrally Molded Form On two cubic blocks made of SUS304 spaced by 50 mm and each having size of 10 mm×10 mm×10 mm height, an integrally molded body is placed with its design side up so that weld line (B2) formed on inner resin material (B1) is at the center of the span. A force gauge of φ10 mm is pushed onto weld line (B2) formed on inner resin material (B1) to measure a value when inner resin material (B1) ruptures. The measurement is performed at 4 points along the longer sides and at 2 points along the shorter sides, at 6 points in total. Next, it is placed so that weld line (C2) formed on outer resin material (C1) is at the center of the span. As well, the force gauge of φ10 mm is pushed onto weld line (C2) formed on outer resin material (C1) to measure a value when outer resin material (C1) ruptures. The measurement is performed at 4 points along the longer sides and at 4 points along the shorter sides, at 8 points in total. The measured value of weld strength is evaluated according to the following standard.

A (acceptable): Weld strengths are 98N (10 kgf) or more at all measurement points.
B (unacceptable): Weld strength is less than 98N (10 kgf) at any one of measurement points.

Materials Composition Example 1: Preparation of PAN-Based Carbon Fiber Bundle

Polymer primarily consisting of polyacrylonitrile is spun and then is subject to calcination treatment to make a continuous carbon fiber bundle having total filament number of 12,000. A sizing agent is added to the continuous carbon fiber bundle by the immersion method, and is dried in heated air to prepare a PAN-based carbon fiber bundle. Characteristics of the PAN-based carbon fiber bundle are as follows.
Filament diameter: 7 μm
Mass per unit length: 0.83 g/m
Density: 1.8 g/cm$^3$
Tensile strength: 4.0 GPa
Tensile elastic modulus: 235 GPa Materials Composition Example 2: Preparation of Epoxy Resin Film Epoxy resin (base resin: dicyandiamide/dichlorophenyl methyl urea-hardened epoxy resin) is applied to a mold release paper by a knife coater to prepare an epoxy resin film.

Material Composition Example 3: Preparation of Unidirectional Prepreg

The PAN-based carbon fiber bundle prepared in Material composition example 1 is unidirectionally oriented into a sheet shape, of which both sides are covered with two epoxy resin films prepared in Material composition example 2. The carbon fiber sheet is impregnated with resin to prepare a unidirectional prepreg having thickness of 0.15 mm and carbon fiber weight content of 70%.

Material Composition Example 4: Preparation of Thermoplastic Adhesive Film (D)

Polyester resin ("HYTREL" (registered trademark) 4057 made by DU PONT-TORAY CO., LTD.) fed from a hopper is melt-kneaded in a twin extruder, and is extruded from a T-shaped die. Next, it is cooled and solidified by winding up a chill roll at 60° C. to prepare a polyester resin film having thickness of 0.05 mm. The prepared film is used as thermoplastic adhesive film (D).

Material Composition Example 5: Glass Fiber-Reinforced Polycarbonate Resin

Glass fiber-reinforced polycarbonate resin GSH2030KR (made by Mitsubishi Engineering-Plastics Corporation, polycarbonate resin matrix, fiber weight content 30 wt %) is used.

Material Composition Example 6: Long Carbon Fiber-Reinforced Nylon Resin

Long carbon fiber pellet TLP-1146S (made by Toray Industries, Inc., nylon 6 resin matrix, fiber weight content of 20 wt %) is dry-blended with nylon 6 resin CM1007 (made by Toray Industries, Inc., nylon 6 resin matrix, non-reinforced) to prepare a long carbon fiber-reinforced nylon resin having fiber weight content of 15 wt %.

Example 1

After adjusting the size of unidirectional prepreg prepared in Material composition example 3 and thermoplastic adhesive film (D) prepared in Material composition example 4 to 400 mm square, they were stacked in the order of (unidirectional prepreg 0°/unidirectional prepreg 90°/unidirectional prepreg 0°/unidirectional prepreg 90°/unidirectional prepreg 90°/unidirectional prepreg 0°/unidirectional prepreg 90°/unidirectional prepreg 0°/adhesive film). The prepared laminate was sandwiched by mold release films and was further sandwiched by tool plates. To adjust the thickness, a spacer having thickness of 1.25 mm was inserted between tool plates. After the plates were placed on boards having a board face temperature of 150° C., a heat press was performed with the board plates closed at 3 MPa. Five minutes after the pressing, the boards were opened to take out a thermally hardened CFRP plate provided with a plate-shaped thermoplastic adhesive film (D) having thickness of 1.25 mm. The prepared film was used as plate material (A) 2 provided with thermoplastic adhesive film (D).

Next, GF-reinforced polycarbonate resin prepared in Material composition example 5 was injected into a molding die shown in FIG. 8 to prepare a rectangular frame material shown in FIG. 2 having width of 2.0 mm and thickness of 3.0 mm, under a condition of 150 MPa pressure, 320° C. cylinder temperature, 120° C. molding die temperature and φ3 mm resin discharging outlet diameter. The prepared frame material was used as outer resin material (C1).

Figure 17:
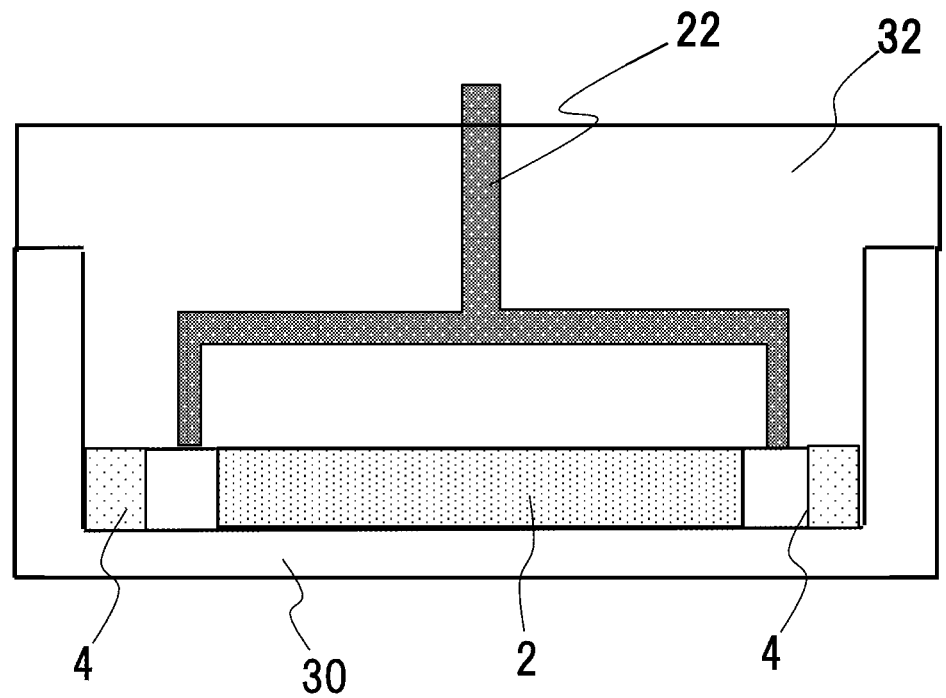
FIG. 17 is a cross section view of molding die provided with resin injection gate (GB) for injecting precursor of inner resin material (B1) and space (cavity) to form inner resin material (B1) in step [3] to form inner resin material (B1).

As shown in FIG. 17, plate material (A) 2 (CFRP plate provided with thermoplastic adhesive film having size of 300 mm×200 mm) was placed as spaced from outer resin material (C1) in outer resin material (C1) by positioning with the design side facing lower molding die 30. After upper molding die 32 was set, glass fiber-reinforced polycarbonate resin was injected into the molding die shown in FIG. 13 under a condition of 150 MPa pressure, 320° C. cylinder temperature, 120° C. molding die temperature and φ3 mm resin discharging outlet diameter. After being clamped, inner resin material (B1) (GF-reinforced polycarbonate resin) prepared in Material composition example 5 was injected to manufacture integrally molded body 1 comprising plate material (A) 2 (top board shown in the schematic view of FIG. 3). Table 1 shows characteristics of integrally molded body of Example 1.

Example 2

An integrally molded body was manufactured by the same method as Example 1, except that positions of resin injection gates (GC) of outer resin material (C1) were changed as shown in FIG. 14. Table 1 shows characteristics of integrally molded body 1.

Example 3

Figure 15:
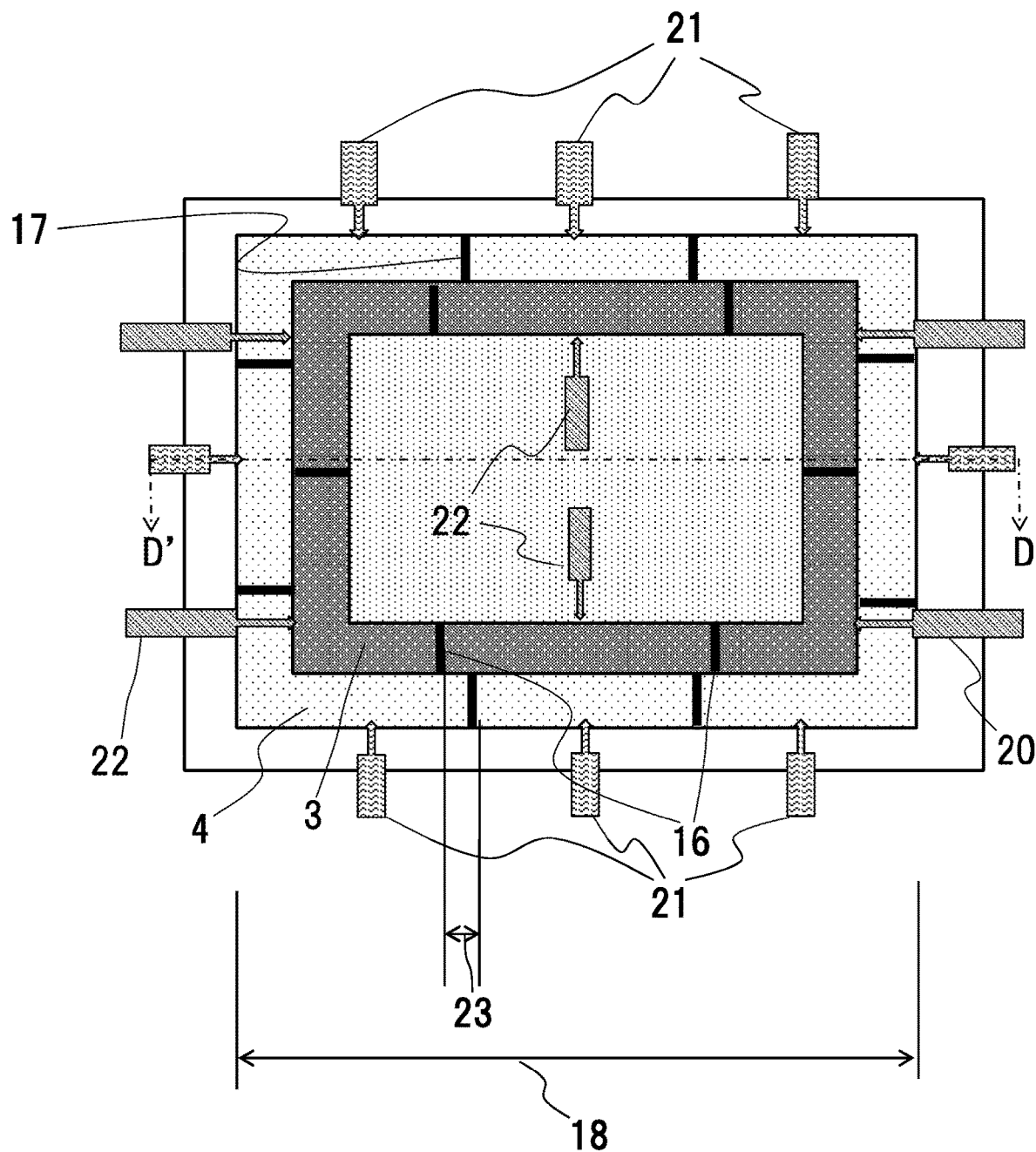
FIG. 15 is a bottom view showing step [3] according to yet another example of FIG. 13 to place preliminarily formed outer resin material (C1) and then form inner resin material (B1) by injecting precursor of inner resin material (B1) from a plurality of resin injection gates (GB).

An integrally molded body was manufactured by the same method as Example 1, except that positions of resin injection gates (GC) of outer resin material (C1) were changed as shown in FIG. 15. Table 1 shows characteristics of integrally molded body 1.

Example 4

An integrally molded body was manufactured by the same method as Example 1, except that outer resin material (C1) and inner resin material (B1) were changed to other materials. Table 1 shows characteristics of integrally molded body 1.

Example 5

An integrally molded body was manufactured by the same method as Example 3, except that outer resin material (C1) and inner resin material (B1) were changed to other materials. Table 1 shows characteristics of integrally molded body 1.

Comparative Example 1

Figure 16:
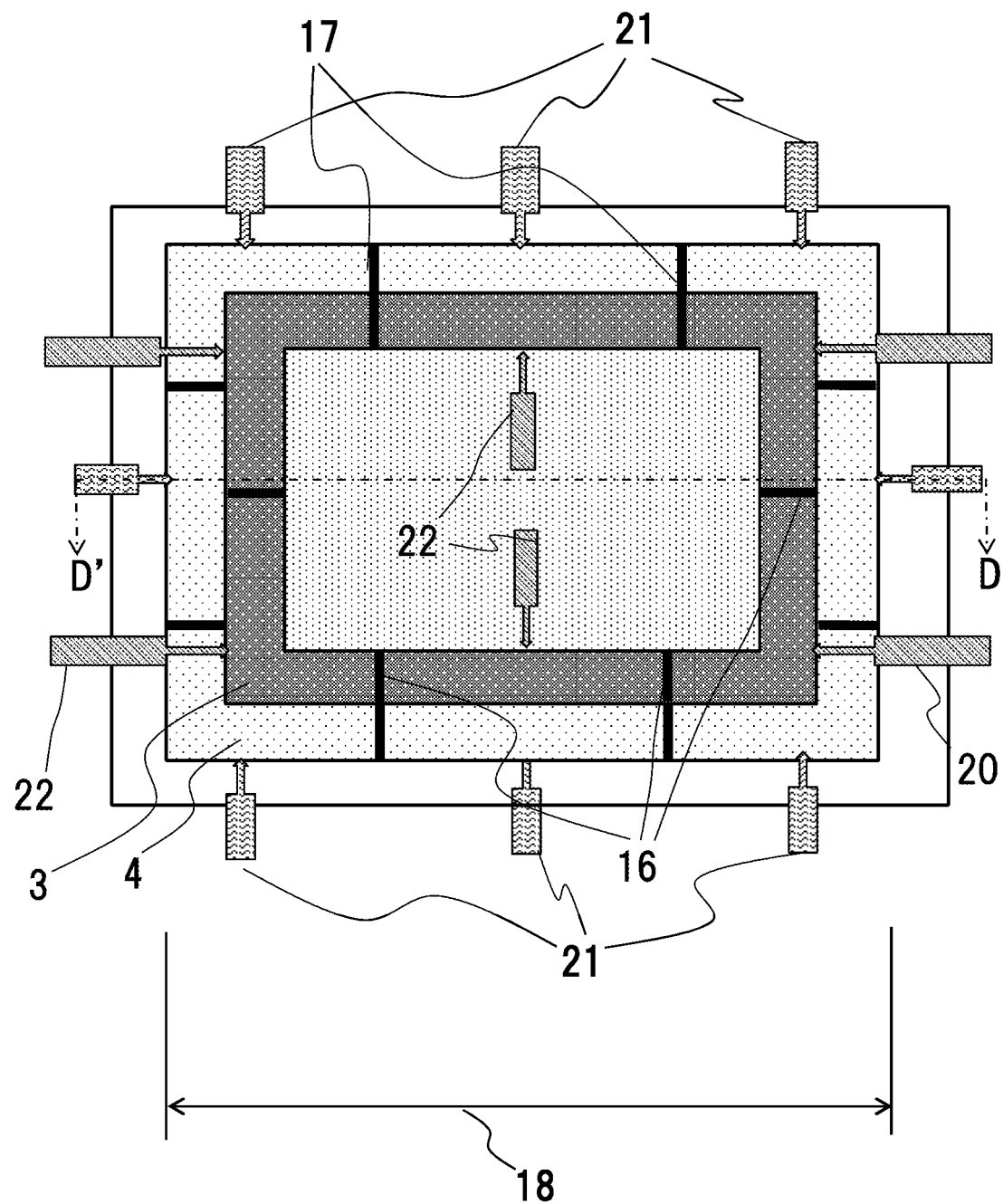
FIG. 16 is a bottom view showing step [3] according to yet another example of FIG. 13 to place preliminarily formed outer resin material (C1) and then form inner resin material (B1) by injecting precursor of inner resin material (B1) from a plurality of resin injection gates (GB).

An integrally molded body was manufactured by the same method as Example 1, except that positions of resin injection gates (GC) of outer resin material (C1) were changed as shown in FIG. 16. Table 1 shows characteristics of integrally molded body 1.

TABLE 1

| Components | | | | | Example 1 | Example 2 | Example 3 | Example 4 | Example 5 | Comparative example 1 |
|---|---|---|---|---|---|---|---|---|---|---|
| | Plate material (A) | | | — | CFRP plate with thermoplastic adhesive film (A) | CFRP plate with thermoplastic adhesive film (A) | CFRP plate with thermoplastic adhesive film (A) | CFRP plate with thermoplastic adhesive film (A) | CFRP plate with thermoplastic adhesive film (A) | CFRP plate with thermoplastic adhesive film (A) |
| | Resin material (B) | | | — | GF-reinforced polycarbonate resin | GF-reinforced polycarbonate resin | GF-reinforced polycarbonate resin | GF-reinforced polycarbonate resin | GF-reinforced polycarbonate resin | GF-reinforced polycarbonate resin |
| | Resin material (C) | | | — | GF-reinforced polycarbonate resin | GF-reinforced polycarbonate resin | GF-reinforced polycarbonate resin | GF-reinforced polycarbonate resin | GF-reinforced polycarbonate resin | GF-reinforced polycarbonate resin |
| Integrally molded body | Shape of integrally molded body | | | — | FIG. 2 | FIG. 2 | FIG. 2 | FIG. 2 | FIG. 2 | FIG. 2 |
| | Integration method | | | — | Injection molding | Injection molding | Injection molding | Injection molding | Injection molding | Injection molding |
| | Characteristics of each material of integrally molded body | Resin (A) | Weight average fiber length | mm | 0.3 | 0.3 | 0.3 | 0.5 | 0.5 | 0.3 |
| | | Resin (C) | | | 0.3 | 0.3 | 0.3 | 0.5 | 0.3 | 0.3 |
| | [Distance M2 between weld line (B2) and closest weld line (C2)]/ [Outer peripheral length M1 of integrally molded body] | Inner resin material (B1) | Measuring point | 1 | 0.08 | 0.06 | 0.10 | 0.08 | 0.08 | 0.00 |
| | | | | 2 | 0.08 | 0.06 | 0.10 | 0.08 | 0.08 | 0.00 |
| | | | | 3 | 0.17 | 0.17 | 0.31 | 0.17 | 0.17 | 0.15 |
| | | | | 4 | 0.08 | 0.06 | 0.10 | 0.08 | 0.08 | 0.00 |
| | | | | 5 | 0.08 | 0.06 | 0.10 | 0.08 | 0.08 | 0.00 |
| | | | | 6 | 0.18 | 0.18 | 0.28 | 0.18 | 0.18 | 0.16 |
| | | Outer resin material (C1) | Measuring point | 1 | 0.08 | 0.06 | 0.10 | 0.08 | 0.08 | 0.00 |
| | | | | 2 | 0.08 | 0.06 | 0.10 | 0.08 | 0.08 | 0.00 |
| | | | | 3 | 0.17 | 0.15 | 0.26 | 0.17 | 0.17 | 0.15 |
| | | | | 4 | 0.08 | 0.06 | 0.10 | 0.08 | 0.08 | 0.00 |
| | | | | 5 | 0.08 | 0.06 | 0.10 | 0.08 | 0.08 | 0.00 |
| | | | | 6 | 0.18 | 0.15 | 0.24 | 0.18 | 0.18 | 0.15 |
| | Weld strength measuring point | Inner resin material (B1) | Measuring point | 1 N (kg·f) | 133.5 (13.6) | 124.5 (12.7) | 154.2 (15.7) | 123.2 (12.5) | 129.9 (13.2) | 68.4 (7.0) |
| | | | | 2 | 140.0 (14.2) | 118.7 (12.1) | 164.3 (16.7) | 134.7 (13.7) | 134.7 (13.7) | 59 (6.0) |
| | | | | 3 | 178.5 (18.2) | 180.0 (18.3) | 214.0 (21.8) | 163.4 (16.6) | 175.8 (17.9) | 170.5 (17) |
| | | | | 4 | 122.6 (12.5) | 108.4 (11.0) | 143.5 (14.6) | 121.1 (12.3) | 118.8 (12.1) | 58.3 (5.9) |
| | | | | 5 | 110.9 (11.3) | 116.8 (9.8) | 138.7 (14.1) | 108.9 (11.1) | 109.6 (12.1) | 54.2 (5.5) |
| | | | | 6 | 168.9 (17.2) | 209.2 (21.3) | 224.2 (22.8) | 162.8 (16.6) | 140.5 (16.4) | 153.8 (15.7) |
| | | Outer resin material (C1) | Measuring point | 1 | 139.2 (14.2) | 124.4 (12.7) | 140.2 (14.2) | 130.5 (13.3) | 143.2 (14.6) | 62.6 (6.4) |
| | | | | 2 | 127.5 (13.0) | 123.1 (9.8) | 178.9 (18.2) | 125.0 (12.7) | 124.9 (12.7) | 70.0 (7.1) |
| | | | | 3 | 192.1 (19.6) | 182.2 (18.6) | 204.6 (20.9) | 190.4 (19.4) | 201.5 (20.6) | 169.8 (17.3) |
| | | | | 4 | 187.4 (19.1) | 198.7 (20.3) | 216 (22.0) | 185.9 (189.7) | 190.3 (19.4) | 170.6 (17.4) |
| | | | | 5 | 140.8 (14.4) | 129.2 (13.2) | 141.5 (14.4) | 142.8 (14.5) | 152.6 (15.6) | 78.4 (8) |
| | | | | 6 | 135.5 (13.6) | 118.7 (12.1) | 135.5 (13.6) | 135.4 (13.8) | 139.9 (14.3) | 65.4 (6.8) |
| | | | | 7 | 194.1 (19.8) | 189.1 (19.3) | 216.4 (22.0) | 189.9 (19.3) | 208.0 (21.2) | 182.3 (18.6) |
| | | | | 8 | 203.0 (20.7) | 209.9 (21.4) | 198.5 (20.2) | 201.4 (20.5) | 209.7 (21.4) | 178.0 (18.2) |
| | Comprehensive evaluation | | | — | A | A | A | A | A | B |

INDUSTRIAL APPLICATIONS

Our integrally molded body can be effectively used as automotive interior/exterior material, electric/electronic equipment housing, constructional material for bicycle or sport gear, airplane interior material, housing for transportation or the like.

The invention claimed is:

1. An integrally molded body having a rectangular planar structure comprising: a plate material (A) having a surface of a design side; an outer resin material (C1) containing a thermoplastic resin and; an inner resin material (B1) containing a thermoplastic resin interposed between the plate material (A) and the outer resin material (C1), the rectangular planar structure having: a first junction to join the inner resin material (B1) with a whole region or a partial region of an outer peripheral side face and/or an outer peripheral edge of the plate material (A); and a second junction to join the outer resin material (C1) with a whole region or a partial region of an outer peripheral side face and/or an outer peripheral edge of the inner resin material (B1), wherein one or more weld lines are formed on the inner resin material (B1) and the outer resin material (C1) on a non-design side opposite the design side of the plate material (A), and a first weld line (B2) formed on the inner resin material (B1) is located at a position shifted from that of a second weld line (C2) formed on the outer resin material (C1) closest to the first weld line (B2) in a direction parallel to an outer peripheral side of the integrally molded body.

2. The integrally molded body according to claim 1, wherein a ratio of M2/M1 is 0.04 to 0.4, where the M1 (mm) is a length of the outer peripheral side of the integrally molded body while the M2 (mm) is a distance between the first weld line (B2) and the second weld line (C2) closest to the first weld line (B2).

3. The integrally molded body according to claim 1, wherein the first weld line (B2) is formed in a narrow width portion (B1') of the inner resin material (B1).

4. The integrally molded body according to claim 1, wherein the second weld line (C2) is formed in a narrow width portion (C1') of the outer resin material (C1).

5. The integrally molded body according to claim 1, wherein the first junction is formed around all of the outer peripheral side face and/or the outer peripheral edge of the plate material (A).

6. The integrally molded body according to claim 1, wherein the second junction is formed around all of the outer peripheral side face and/or the outer peripheral edge of the plate material (A).

7. The integrally molded body according to claim 1, wherein the inner resin material (B1) or the outer resin material (C1) contains a discontinuous reinforcing fiber having a weight average fiber length of 0.3 to 3 mm.

* * * * *